US009935732B2

(12) United States Patent
Ljung et al.

(10) Patent No.: US 9,935,732 B2
(45) Date of Patent: Apr. 3, 2018

(54) ADAPTIVE INDEX MAPPING FOR MODULATION SCHEME SETTINGS

(71) Applicant: Sony Corporation, Tokyo (JP)

(72) Inventors: Rickard Ljung, Helsingborg (SE); Basuki Priyanto, Lund (SE)

(73) Assignee: Sony Mobile Communications, Inc., Tokyo (JP)

( * ) Notice: Subject to any disclaimer, the term of this patent is extended or adjusted under 35 U.S.C. 154(b) by 111 days.

(21) Appl. No.: 14/671,658

(22) Filed: Mar. 27, 2015

(65) Prior Publication Data

US 2016/0226621 A1 Aug. 4, 2016

Related U.S. Application Data

(63) Continuation of application No. PCT/EP2015/051942, filed on Jan. 30, 2015.

(51) Int. Cl.
| | |
|---|---|
| *H04W 4/00* | (2009.01) |
| *H04L 1/00* | (2006.01) |
| *H04L 27/34* | (2006.01) |
| *H04W 76/02* | (2009.01) |

(52) U.S. Cl.
CPC .......... *H04L 1/0003* (2013.01); *H04L 1/0016* (2013.01); *H04L 27/34* (2013.01); *H04W 4/005* (2013.01); *H04W 76/025* (2013.01)

(58) Field of Classification Search
CPC ... H04W 76/025; H04W 72/0453; H04J 1/00; H04L 27/34
See application file for complete search history.

(56) References Cited

U.S. PATENT DOCUMENTS

| | | | | |
|---|---|---|---|---|
| 6,597,672 B1 * | 7/2003 | Gustafsson | ......... | H04W 76/025 370/329 |
| 9,621,362 B2 * | 4/2017 | Livanos | .............. | H04L 12/1407 |
| 2003/0214914 A1 * | 11/2003 | Cain | .................... | H04B 7/0491 370/252 |

(Continued)

FOREIGN PATENT DOCUMENTS

EP   2 787 670   10/2014

OTHER PUBLICATIONS

International Search Report and Written Opinion dated Oct. 9, 2015 in connection with PCT/EP2015/051942.

(Continued)

*Primary Examiner* — Khaled Kassim
*Assistant Examiner* — Syed S Ali
(74) *Attorney, Agent, or Firm* — Wolf, Greenfield & Sacks, P.C.

(57) ABSTRACT

A node (100) of a cellular network selects a first modulation scheme setting for a first radio link to a first device (10'). The first modulation scheme setting is selected from a set of modulation scheme settings, each identified by at least one corresponding index. On the basis of a mapping of each of the indices to a corresponding set of transmission parameters, the node (100) identifies a first set of link parameters mapped to the index corresponding to the selected first modulation scheme setting. The node (100) then configures the first radio link according to the identified first set of link parameters. Further, the node (100) selects a second modulation scheme setting for a second radio link to a second device (10).

19 Claims, 8 Drawing Sheets

(56) References Cited

U.S. PATENT DOCUMENTS

| | | | | |
|---|---|---|---|---|
| 2013/0051326 A1* | 2/2013 | Jeyatharan | H04L 47/245 | 370/328 |
| 2013/0132604 A1* | 5/2013 | Cohen | H04W 76/025 | 709/231 |
| 2013/0272221 A1* | 10/2013 | Hoehne | H04L 45/24 | 370/329 |
| 2014/0051426 A1* | 2/2014 | Siomina | H04W 36/0088 | 455/422.1 |
| 2014/0269632 A1* | 9/2014 | Blankenship | H04W 76/025 | 370/336 |
| 2014/0293988 A1* | 10/2014 | Han | H04L 5/0085 | 370/344 |
| 2016/0036618 A1* | 2/2016 | Einhaus | H04L 1/0003 | 370/329 |
| 2016/0095099 A1* | 3/2016 | Yang | H04L 5/00 | 370/330 |
| 2016/0165462 A1* | 6/2016 | Tan | H04W 24/02 | 370/254 |

OTHER PUBLICATIONS

[No Author Listed] CQI/MCS/TBS Tables for 256QAM and Relevant Signaling. Agenda Item 7.2.4.1 from Intel Corporation. 3GPP TSG RAN WGI Meeting #76. Prague, Czech Republic. Feb. 10-14, 2014, 3GPP Draft; R1-140118 Intel Corporation. Third Generation Partnership Project. Retrieved from the Internet via http://www.3gpp.org/ftp/Meetings_3GPP_SYNC/RAN/RAN1/Docs/ retrieved on Feb. 9, 2014. 8 pages.

[No Author Listed] UE power consumption reduction techniques for MTC. Agenda Item 6.3.1.1.3 from Ericsson. 3GPP TSG RAN WG1 Meeting #79. San Francisco, USA. Nov. 17-21, 2014. 3GPP Draft; R1-144557. Ericsson. Third Generation Partnership Project. Retrieved from the Internet via http://www.3gpp.org/ftp/Meetings_3GPP_SYNC/RAN/RAN1/Docs/ retrieved on Nov. 17, 2014. 2 pages.

[No Author Listed] Coverage analysis and evaluation on PDSCH/PUSCH and Reference Signals for low-cost MTC UEs. Agenda Item 7.2.4.4 from Huawei, HiSilicon. 3GPP TSG RAN WGI Meeting #72bis. Chicago, USA. Apr. 15-19, 2013. 3GPP Draft; R1-130888. Huawei, HiSilicon. Third Generation Partnership Project. Retrieved from the Internet via http://www.3gpp.org/ftp/tsg_ran/WGI_RL1/TSGRI_72b/Docs/ retrieved on Apr. 6, 2013. 10 pages.

* cited by examiner

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Fig. 2

ADAPTIVE INDEX MAPPING FOR MODULATION SCHEME SETTINGS

CROSS-REFERENCE TO RELATED APPLICATION

This application is a continuation application claiming the benefit of International Application No. PCT/EP2015/051942, filed Jan. 30, 2015, the entire contents of which is incorporated herein by reference.

FIELD OF THE INVENTION

The present invention relates to a method of radio link control in a cellular network and to correspondingly configured devices.

BACKGROUND OF THE INVENTION

In cellular networks, performance of a radio link to a device connected to the cellular network may be optimized by adaptation of a modulation and coding scheme (MCS) utilized on the radio link. For example, in the LTE (Long Term Evolution) radio technology specified by 3GPP ($3^{rd}$ Generation Partnership Project), modulation schemes ranging from QPSK (Quadrature Phase Shift Keying) to 256QAM ($8^{th}$ order Quadrature Amplitude Modulation) may be selected depending on channel quality. In this way, a throughput in terms of a number of bits per transmitted data symbol may be maximized on the given link.

Irrespective of a general trend to increased performance on the radio link, also Machine Type Communication (MTC) is gaining increasing attention. In the case of MTC, autonomously operating devices such as sensors or actuators, are connected via the cellular network and typically operate without interaction of a user.

For MTC devices, low power consumption is an important aspect for ensuring long battery life. To achieve such low power consumption, various measures may be considered. For example, in 3GPP TR 36.888 V12.0.0 (2013-06), it is suggested to limit a transport block size or modulation order on radio links to MTC devices. It is also mentioned that BPSK (Binary Phase Shift Keying) could be utilized.

However, introducing a further modulation scheme into the existing LTE radio technology is a challenging task since the LTE radio technology was designed to support modulation schemes ranging from QPSK up to 256QAM, and a newly introduced modulation scheme should not adversely affect compatibility with existing LTE devices. For example, in the LTE radio technology, settings with respect to the modulation and coding scheme are identified through a 5-bit MCS index, referred to as $I_{MCS}$, and a table in which modulation order and transport block size index are specified for each MCS index value, as specified in 3GPP TS 36.213 V12.4.0 (2014-12). Due to the limitation of the MCS index to 5 bits, also the size of the table is limited and cannot be extended beyond the existing 32 entries. Further, also a complete replacement of the table adds undesirable complexity because the existing version of the table would typically need to be maintained as well for compatibility reasons.

Accordingly, there is a need for techniques which allow for efficiently increasing the flexibility of a cellular network with respect to the selection of modulation schemes.

SUMMARY OF THE INVENTION

According to an embodiment of the invention, a method is provided. According to the method, a node of a cellular network, e.g., a base station, selects a first modulation scheme setting for a first radio link to a first device. The first modulation scheme setting is selected from a set of modulation scheme settings, each identified by at least one corresponding index. On the basis of a mapping of each of the indices to a corresponding set of transmission parameters, the node identifies a first set of link parameters mapped to the index corresponding to the selected first modulation scheme setting. The node then configures the first radio link according to the identified first set of link parameters. Further, the node selects a second modulation scheme setting for a second radio link to a second device. The second modulation scheme setting is based on a modulation scheme of lower complexity than the set of modulation scheme settings. For the second radio link, the node re-assigns one of the indices to the selected second modulation scheme setting and adapts the mapping with respect to the set of link parameters mapped to re-assigned index. On the basis of the adapted mapping, the node identifies a second set of link parameters mapped to the re-assigned index. The node then configures the second radio link according to the identified second set of link parameters.

Accordingly, the same index may be efficiently re-utilized for identifying both link parameters for the modulation scheme settings from the set and for identifying link parameters for the additional second modulation scheme settings based on the lower complexity modulation scheme.

According to an embodiment, the at least one link parameter comprises a modulation order and/or a transport block size.

According to an embodiment, the set of modulation scheme settings is based on QPSK and QAM. The second modulation scheme setting may be based on BPSK, π/2 BPSK, or on GMSK (Gaussian Minimum Shift Keying).

According to an embodiment, the node indicates to the second device that the adapted mapping is applied on the second radio link. The second device may then adapt its operation accordingly.

According to an embodiment, the node receives from the second device an indication of a device category of the second device. The node may then select the second modulation scheme setting in response to the device category corresponding to a MTC category.

According to an embodiment, the node performs an analysis of parameters related to radio communication between the second device and the cellular network and selects the second modulation scheme setting on the basis of the analysis.

The node may select the second modulation scheme setting at establishment of the second radio link or may select the second modulation scheme setting during an ongoing connection via the second radio link.

According to an embodiment, second modulation scheme setting is selected from a set of multiple second modulation scheme settings and the node re-assigns one of the indices to each of the multiple second modulation scheme settings. Accordingly, it is possible to support multiple different low complexity modulation schemes and/or different sets of link parameters for such low complexity modulation scheme, e.g., with respect to transport block size.

According to a further embodiment of the invention, a method is provided. According to the method a device selects a first modulation scheme setting for a radio link to a cellular network, the first modulation scheme setting is selected from a set of modulation scheme settings, each identified by a corresponding index. On the basis of a mapping of each of the indices to a corresponding set of link parameters, the device identifying a first set of link parameters mapped to the index corresponding to the selected first modulation scheme setting. The device then configures the radio link according to the identified first set of transmission parameters. Further, the device selects a second modulation scheme setting for the radio link, the second modulation scheme setting being based on a modulation scheme of lower complexity than the set of modulation scheme settings. The device re-assigning one of the indices to the selected second modulation scheme setting and adapts the mapping with respect to the set of link parameters mapped to the re-assigned index. On the basis of the adapted mapping, the device identifies a second set of link parameters mapped to the re-assigned index. The device then configures the second radio link according to the identified second set of transmission parameters.

According to an embodiment, the at least one link parameter comprises a modulation order and/or a transport block size.

According to an embodiment, the set of modulation scheme settings is based on QPSK and QAM. The second modulation scheme setting may be based on BPSK, $\pi/2$ BPSK, or on GMSK.

According to an embodiment, the device selects the second modulation scheme setting in response to an indication from the cellular network.

The device may select the second modulation scheme setting at establishment of the radio link or during an ongoing connection via the radio link.

According to an embodiment, the second modulation scheme setting is selected from a set of multiple second modulation scheme settings and the device re-assigns one of the indices to each of the multiple second modulation scheme settings.

According to a further embodiment of the invention, a node for a cellular network is provided. The node comprises at least one interface for controlling radio links to devices. Further, the node comprises at least one processor. The at least one processor is configured to:
- select a first modulation scheme setting for a first radio link to a first device, the first modulation scheme setting being selected from a set of modulation scheme settings, each identified by at least one corresponding index;
- on the basis of a mapping of each of the indices to a corresponding set of transmission parameters, identify a first set of link parameters mapped to the index corresponding to the selected first modulation scheme setting;
- configure the first radio link according to the identified first set of link parameters;
- select a second modulation scheme setting for a second radio link to a second device, the second modulation scheme setting being based on a modulation scheme of lower complexity than the set of modulation scheme settings;
- re-assign one of the indices to the selected second modulation scheme setting and adapt the mapping with respect to the set of link parameters mapped to re-assigned index;
- on the basis of the adapted mapping, identify a second set of link parameters mapped to the re-assigned index; and
- configure the second radio link according to the identified second set of link parameters.

The at least one processor may be is configured to perform the steps of the above method performed by the node of the cellular network.

According to a further embodiment of the invention, a device is provided. The device comprises a radio interface for connecting to a cellular network. Further, the device comprises at least one processor. The at least one processor is configured to:
- select a first modulation scheme setting for a radio link to a cellular network, the first modulation scheme setting selected from a set of modulation scheme settings, each identified by a corresponding index;
- on the basis of a mapping of each of the indices to a corresponding set of link parameters, identify a first set of link parameters mapped to the index corresponding to the selected first modulation scheme setting;
- configure the radio link according to the identified first set of transmission parameters;
- select a second modulation scheme setting for the radio link, the second modulation scheme setting being based on a modulation scheme of lower complexity than the set of modulation scheme settings;
- re-assign one of the indices to the selected second modulation scheme setting and adapt the mapping with respect to the set of link parameters mapped to the re-assigned index;
- on the basis of the adapted mapping, identify a second set of link parameters mapped to the re-assigned index; and
- configure the second radio link according to the identified second set of transmission parameters.

The at least one processor may be is configured to perform the steps of the above method performed by the device.

The above and further embodiments of the invention will now be described in more detail with reference to the accompanying drawings.

BRIEF DESCRIPTION OF THE DRAWINGS

FIG. 2 shows an exemplary table for mapping indices of modulation scheme settings to link parameters as utilized in an embodiment of the invention.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to control of radio links between a cellular network and devices connected thereto. Radio connectivity between the devices and the cellular network is assumed to be provided by the LTE radio technology. However, it is to be understood that the illustrated concepts could also be applied in connection with other radio technologies.

In the illustrated embodiments, it is assumed that at least two different categories of devices may connect to the cellular network: normal UEs (UE: user equipment) and MTC UEs. The normal UEs may for example correspond to mobile phones, tablet computers, or other kinds of user terminals. The MTC UEs may in turn correspond autonomously operating devices, typically operated without interaction by a user, such as sensors, smart meters, wearable devices, or actuators. The MTC UEs typically also differ from the normal UEs with respect to characteristics of data traffic to or from the cellular network: For normal UEs high traffic volumes may be transferred depending on the usage behaviour of the user, with a higher traffic volume in a downlink direction from the cellular network to the UE than in an uplink direction from the UE to the cellular network. As compared to that, for MTC UEs typically lower traffic volumes are transferred in a sparse pattern. The data traffic of an MTC UE may also have a lower traffic volume in the downlink direction than in the uplink direction. As compared to normal UEs, the sparse pattern and low volume of the data traffic of an MTC UE typically also results in sizes of transferred data packets which are smaller than for normal UEs. Further, also typical locations of deployment of MTC UEs may differ from normal those of normal UEs. For example, an MTC UE may be deployed in a basement to which penetration of radio signals from the cellular network is limited.

Figure 1:
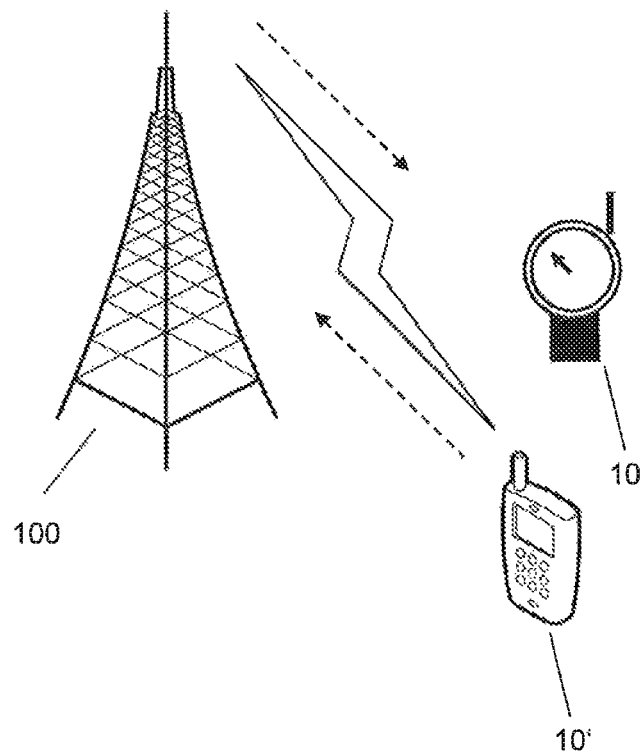
FIG. 1 schematically illustrates a cellular network scenario according to an embodiment of the invention.

FIG. 1 schematically illustrates an exemplary cellular network scenario. More specifically, FIG. 1 shows a base station of the cellular network, in accordance with the assumed utilization of the LTE radio technology in the following also referred to as eNB ("evolved Node B"), and devices 10, 10' connected via the eNB 100 to the cellular network. In the illustrated example, the device 10 corresponds to an MTC-UE, and the device 10' corresponds to a normal UE. In the scenario of FIG. 1, a first radio link is established between the normal UE 10' and the eNB 100, and a second radio link is established between the MTC UE 10 and the eNB 100.

Due to the autonomous operation of MTC UEs, a lowered power consumption is highly desirable to extend battery life. The concepts as further explained in the following aim at enabling such lowered power consumption by supporting efficient operation of a power amplifier in a radio transceiver of the MTC UE. For this purpose, an LTE radio link between an MTC UE and the cellular network may be enhanced to support one or more modulation schemes of lower complexity, specifically lower order, than the modulation schemes conventionally supported on an LTE radio link, namely QPSK, 16QAM, 64QAM, and optionally 256QAM. Such lower complexity modulation scheme may for example be π/2 BPSK. Alternatively or in addition, also BPSK or GMSK could be supported. Typically, the lower complexity modulation scheme modulates only one bit of data on each transmitted data symbol. The lower complexity modulation scheme may allow for operating the power amplifier in its linear region, and to achieve a low peak-to-average power ratio (PAPR) and low cubic metric (CM). Efficient operation of the power amplifier on the basis of such lower complexity modulation scheme may also allow for a better quality of the amplified radio signals and thus be beneficial with respect to deployments in environments with limited penetration of radio signals. The lower complexity modulation schemes may in particular be utilized for an uplink part of the LTE radio link, thereby reducing power consumption of a power amplifier in a transmit branch of the radio transceiver. However, a reduction of power consumption may also be achieved by utilizing the lower complexity modulation schemes may in a downlink part of the LTE radio link, thereby reducing power consumption of a power amplifier in a receive branch of the radio transceiver.

In the illustrated examples, the support of the lower complexity modulation scheme is introduced by selective adaptation of a mechanism for controlling settings with respect to a modulation scheme as specified in 3GPP TS 36.213 V12.4.0. As defined in section 7.1.7 of 3GPP TS 36.213, for downlink transmission an MCS index, referred to as $I_{MCS}$, and a table mapping values of the MCS index ($0 \leq I_{MCS} \leq 32$) to values of a modulation order $Q_m$ and values of a TBS index settings ITBS is used to identify the modulation order and transport block size to be applied on the radio link. Here, the actual transport block size is determined as a function of the TBS index and a resource block size. As defined in section 8.6 of 3GPP TS 36.213, a similar mechanism is provided for the uplink transmission direction. In FIG. 2, the table is illustrated for the case of supporting QPSK, 16QAM, and 64QAM modulation schemes, which are applicable for both the downlink transmission direction and the uplink transmission direction. A similar table also exits for the case of supporting QPSK, 16QAM, and 64QAM as modulation schemes.

As can be seen from the table of FIG. 2, the lowest 10 MCS indices are assigned to QPSK (modulation order $Q_m=2$). As a general rule, an achieved coding rate increases with the MCS index. To allow for adaptation to channel quality, selection of the MCS index for a given radio link may depend on feedback from the UE in terms of a CQI (Channel Quality Indicator). As a general rule, a higher CQI will result in selection of a higher MCS index.

To allow for utilizing a lower complexity modulation scheme, e.g., π/2 BPSK, on the second radio link to the MTC UE 10, one or more of the MCS indices are re-assigned to the lower complexity modulation scheme.

For example, a group of the N lowest indices may be re-assigned to the lower complexity modulation scheme. The size of the group may be chosen depending on the number of different settings needed for the lower complexity modulation scheme. For example, if only one setting with respect to TBS is needed, only the lowest MCS index would be re-assigned (N=1), or if two settings with respect to transport block size are needed, the lowest two MCS indices would be re-assigned (N=2). At the same time, the entries in of table which are mapped to the re-assigned indices are adapted. For example, the modulation order $Q_m$ may be set to $Q_m=1$, and the TBS index may be lowered. This re-assignment and adaptation may be performed in a selective manner in response to identifying the MTC UE 10 as belonging to the MTC category. Further, it should be noted that this re-assignment and adaptation re-assignment and adaptation will typically be performed in a radio link specific manner. Accordingly, in the example as illustrated in FIG. 1, the re-assignment and adaptation would be performed for the second radio link to the MTC UE 10, but not for the first radio link to the normal UE 10'.

Figure 3:
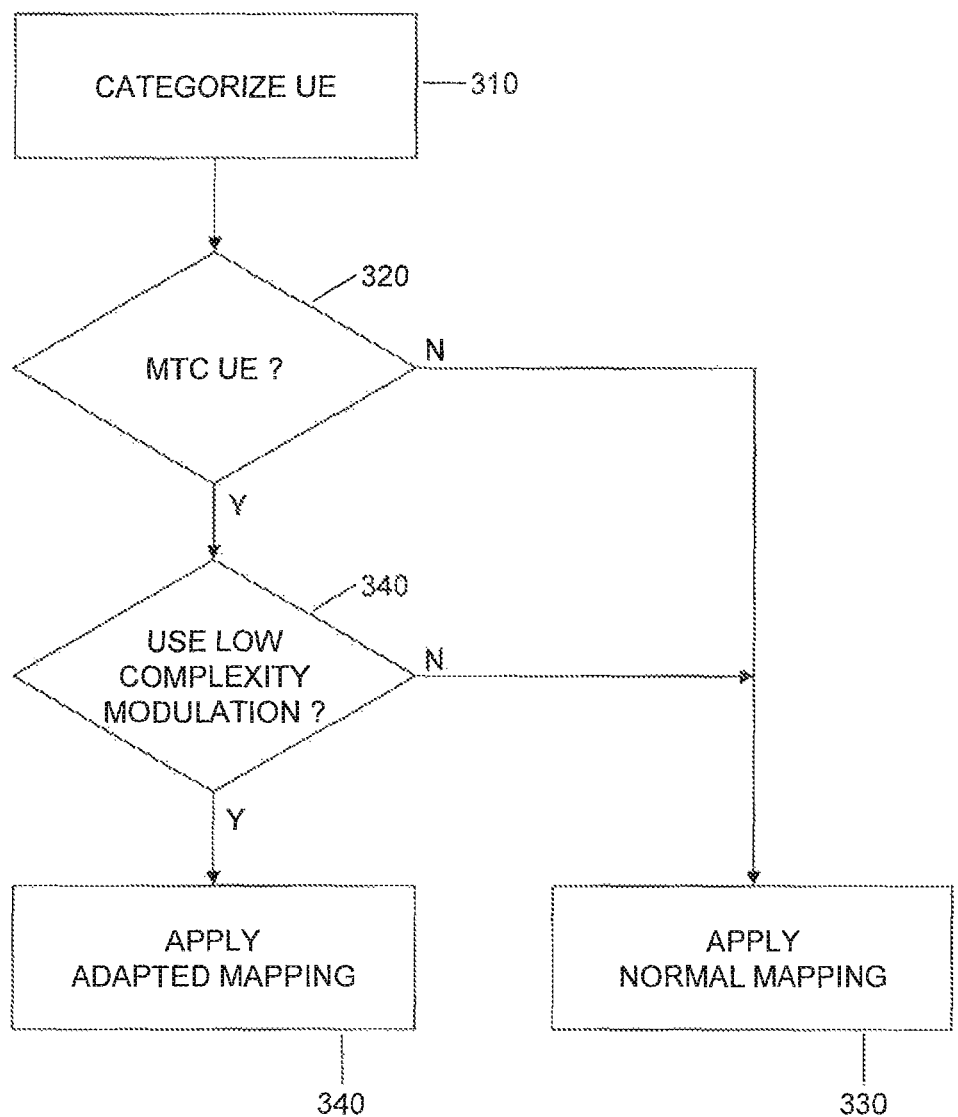
FIG. 3 shows a flowchart for illustrating processes according to an embodiment of the invention.

FIG. 3 shows an exemplary process which may be applied by the eNB 100 for controlling the selective re-assignment and adaptation of the mapping defined by the table of FIG. 2.

At step 310, a UE connecting to the cellular network or already connected to the cellular network is categorized. For example, when connecting to the cellular network, the UE may send a preamble on a Physical Random Access Channel (PRACH) to the eNB 100, and the preamble may include an indication of UE category, allowing for identifying whether the UE corresponds to an MTC UE, or to some other UE category.

At step 320, the eNB 100 checks whether the UE corresponds to an MTC UE. If this is not the case, the process proceeds to step 330, as indicated by branch "N".

At step 330, the normal mapping as defined by the table of FIG. 2 is applied for configuration of a radio link to the UE.

If at step 320 the eNB identifies the UE as corresponding to an MTC UE, the process proceeds to step 340, as indicated by branch "Y". At step 340, where the eNB 100 may decide whether the lower complexity modulation scheme should be applied for this UE. This decision may for example be based on an analysis of current or past data traffic of this UE, or on analysis of parameters relating to such data traffic. For example, the UE may correspond to an MTC UE, but nonetheless frequently transfer higher volumes of data traffic and therefore benefit from higher order modulation schemes, and the eNB 100 may thus decide not to apply the lower complexity modulation scheme for this UE. The decision can also be based on the results from outer loop link adaptation (OLLA) at the eNB 100. Triggers and parameters to consider could be UE and/or eNB transmit power, packet error rate statistics, or the like. Together with the decision to apply the lower complexity modulation scheme for the UE, the eNB 100 may also decide that the higher order modulation schemes should be excluded from selection for this UE. Such decision may for example be taken in response to a corresponding indication from the UE and/or on the basis of the above-mentioned analysis of data traffic or parameters relating thereto.

If the eNB 100 decides not to apply the lower complexity modulation scheme, the process proceeds to step 330, as indicated by branch "N".

If at step 340, the eNB 100 decides to apply the lower complexity modulation scheme, the process proceeds to step 350, as indicated by branch "Y".

At step 350, the re-assignment of one or more indices is performed, and the mapping adapted with respect to these indices is applied for configuration of a radio link to the UE. The eNB 100 may also indicate the application of the adapted mapping to the UE, so that the UE may adjust its operation accordingly, e.g., by applying a correspondingly applied mapping.

A process for selectively deciding whether to apply the adapted mapping or the normal mapping as explained in connection with FIG. 3 may not only be applied when establishing the radio link to the UE, but also during an ongoing connection with the UE. For example, switching between the adapted mapping and the normal mapping could be triggered by changes in radio conditions or changes in the pattern of data traffic generated by the UE.

Figure 4:
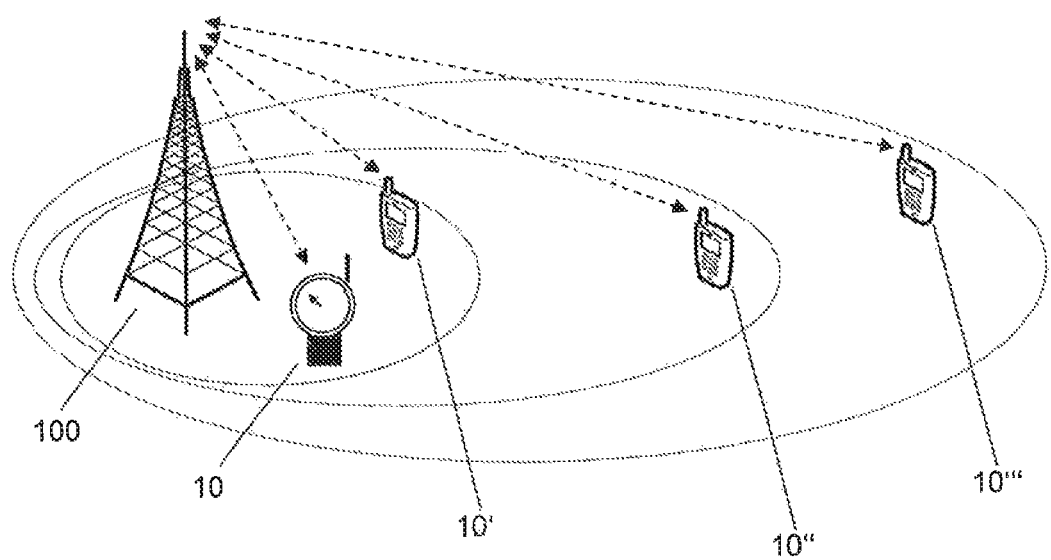
FIG. 4 shows a further cellular network scenario according to an embodiment of the invention.

FIG. 4 shows a further exemplary scenario, in which multiple UEs 10, 10', 10", 10''' have established radio links to the eNB 100. The UE 10 is again assumed to be an MTC UE, while the UEs 10', 10", and 10''' are assumed to be normal UEs.

As illustrated, the UEs 10, 10', 10", 10''' are located at different distances from the eNB 100, which is assumed to cause variations in the channel quality experienced by the respective UE 10, 10', 10", 10'''. In the illustrated scenario, the UEs 10 and 10' are located closest to the eNB 100 and therefore experience the highest channel quality. The UE 10''', which is located farther away from the eNB 100, experiences a lower channel quality than the UEs 10, 10'. The UE 10''', which is located still farther away from the eNB 100, experiences a lower channel quality than the UEs 10, 10', and 10".

In accordance with the channel quality dependent selection of modulation scheme settings from the table of FIG. 2, the radio link to the UE 10' may utilize a modulation scheme setting based on 64QAM, the radio link to the UE 10" may utilize a modulation scheme setting based on 16QAM, and the radio link to the UE 10''' may utilize a modulation scheme setting based on QPSK, reflecting the decreasing channel quality. However, for the MTC UE 10, the low complexity modulation scheme may be selected based on the above-described processes, irrespective of the high channel quality experienced by the MTC UE 10. Such behaviour may for example be achieved by the MTC UE 10 indicating to the eNB 100 that only the low complexity modulation scheme should be selected for the MTC UE 10, i.e., by excluding the higher order modulation scheme settings from being selected.

Figure 5:
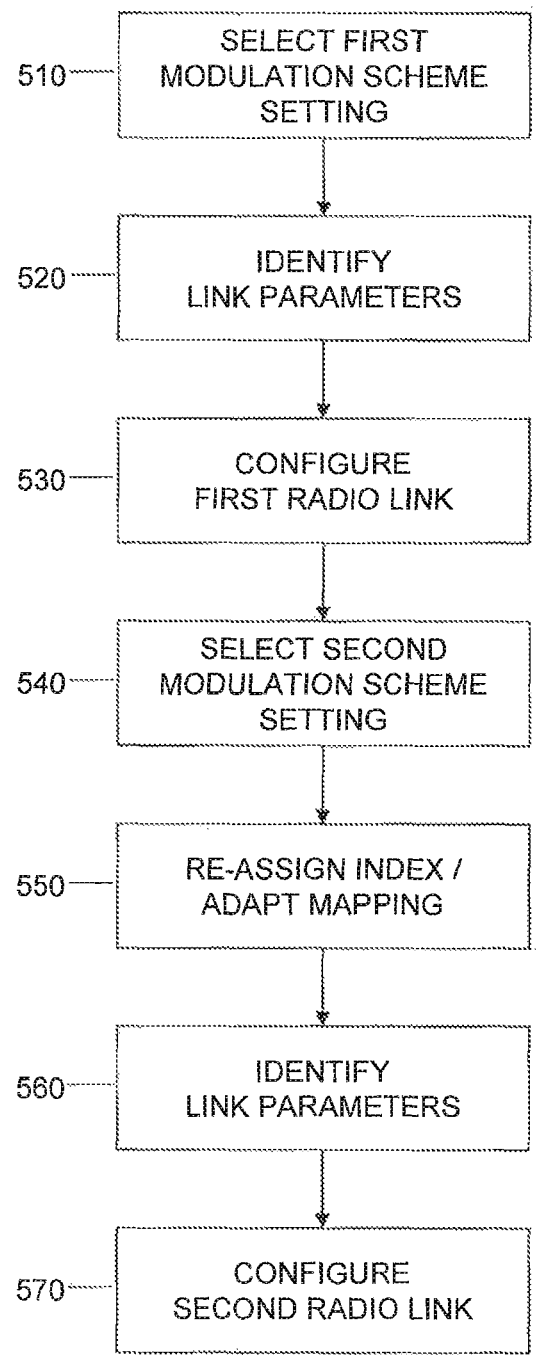
FIG. 5 shows a flowchart for illustrating a method according to an embodiment of the invention.

FIG. 5 shows a flowchart which illustrates a method which may be applied by a node of a cellular network for controlling radio links to devices, e.g., by a base station, such as an eNB of the LTE radio technology. If a processor based implementation of the node is utilized, at least a part of the steps of the method may be performed and/or controlled by one or more processors of the node.

At step 510, the node selects a first modulation scheme setting for a first radio link to a first device. The first modulation scheme setting is selected from a set of modulation scheme settings, each identified by at least one corresponding index. The modulation scheme settings may for example be based on QPSK and QAM modulation schemes. An example of such set of modulation scheme settings is given by the table of FIG. 2, in which 32 different modulation scheme settings are identified by the MCS index.

At step 520, the node uses a mapping of each of the indices to a corresponding set of transmission parameters as a basis for identifying a first set of link parameters mapped to the index corresponding to the selected first modulation scheme setting. As illustrated by the exemplary mapping defined by the table of FIG. 2, such link parameters may for example include a modulation order and/or a transport block size.

At step 530, the node configures the first radio link according to the identified first set of link parameters.

The first modulation scheme setting may be applied with respect to an uplink part of the first radio link and/or with respect to a downlink part of the first radio link.

At step 540, the node selects a second modulation scheme setting for a second radio link to a second device. The second device may for example be a device of the MTC category. The second modulation scheme setting is based on a modulation scheme of lower complexity than the set of modulation scheme settings. For example, the second modulation scheme setting may be based on BPSK, $\pi/2$ BPSK, or GMSK, while the set of modulation scheme settings may be based on QPSK and QAM.

The node may select the second modulation scheme setting at establishment of the second radio link or during an ongoing connection via the second radio link.

In some implementations, the node may receive from the second device an indication of a device category of the second device. The node may then select the second modulation scheme setting in response to the device category corresponding to the MTC category. Alternatively or in addition, the node may also perform an analysis of parameters related to radio communication between the second device and the cellular network and select the second modulation scheme on the basis of the analysis, e.g., as explained in connection with FIG. 3.

In some implementations, the second modulation scheme setting is selected from a set of multiple second modulation scheme settings and the node re-assigns one of the indices to each of the multiple second modulation scheme settings. Each of these multiple modulation scheme settings may be based on the same modulation scheme having a lower complexity than the modulation scheme(s) on which the set of modulation scheme settings is based.

At step 550, the node re-assigns one of the indices to the selected second modulation scheme setting and adapts the mapping with respect to the set of link parameters mapped to re-assigned index. For example this may involve mapping a lower modulation order and/or a lower transport block size to the re-assigned index.

At step 560, uses the adapted mapping as a basis for identifying a second set of link parameters mapped to the re-assigned index.

At step 570, the node configures the second radio link according to the identified second set of link parameters. Further, the node may indicate to the second device that the adapted mapping is applied on the second radio link, thereby allowing for the second device to adapt its operations accordingly.

The second modulation scheme setting may be applied with respect to an uplink part of the second radio link and/or with respect to a downlink part of the second radio link.

Figure 6:
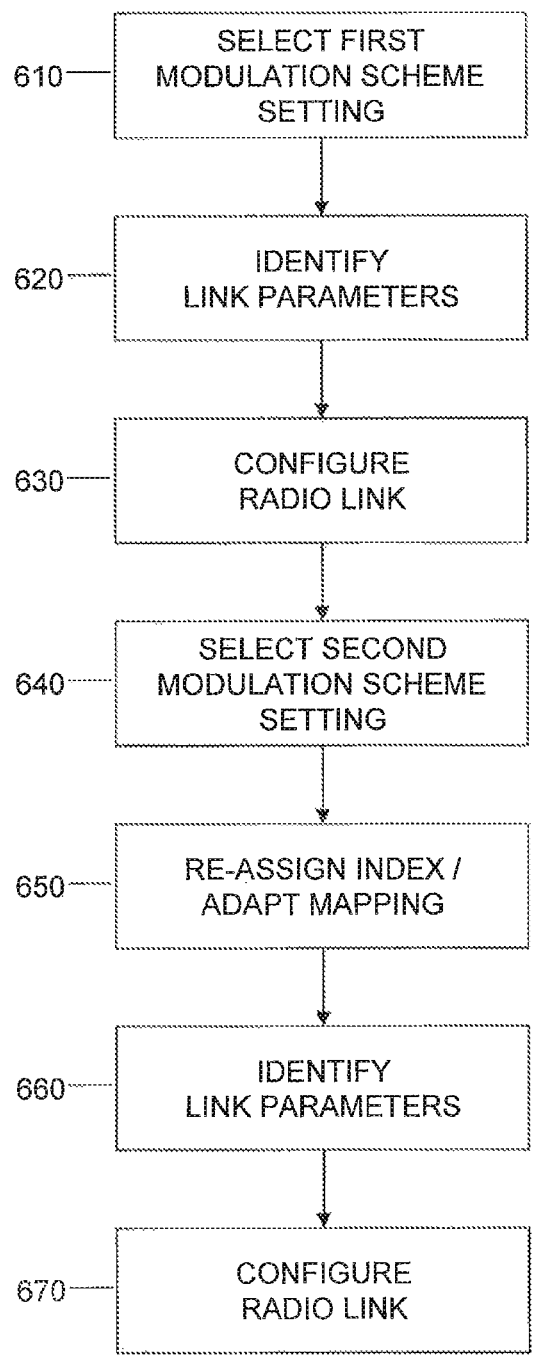
FIG. 6 shows a flowchart for illustrating a further method according to an embodiment of the invention.

FIG. 6 shows a flowchart which illustrates a method which may be applied by a device supporting radio connectivity to a cellular network, such as an MTC UE or other kind of UE. If a processor based implementation of the device is utilized, at least a part of the steps of the method may be performed and/or controlled by one or more processors of the device.

At step 610, the device selects a first modulation scheme setting for a radio link to the cellular network. The first modulation scheme setting is selected from a set of modulation scheme settings, each identified by at least one corresponding index. The modulation scheme settings may for example be based on QPSK and QAM modulation schemes. An example of such set of modulation scheme settings is given by the table of FIG. 2, in which 32 different modulation scheme settings are identified by the MCS index.

The device may select the first modulation scheme setting in response to an indication from the cellular network. For example, the cellular network may indicate the index corresponding to the first modulation scheme setting to the device, e.g., in DCI (Downlink Control Information).

At step 620, the device uses a mapping of each of the indices to a corresponding set of transmission parameters as a basis for identifying a first set of link parameters mapped to the index corresponding to the selected first modulation scheme setting. As illustrated by the exemplary mapping defined by the table of FIG. 2, such link parameters may for example include a modulation order and/or a transport block size.

At step 630, the device configures the radio link according to the identified first set of link parameters.

The first modulation scheme setting may be applied with respect to an uplink part of the radio link and/or with respect to a downlink part of the radio link.

At step 640, the device selects a second modulation scheme setting for the radio link. The second modulation scheme setting is based on a modulation scheme of lower complexity than the set of modulation scheme settings. For example, the second modulation scheme setting may be based on BPSK, π/2 BPSK, or GMSK, while the set of modulation scheme settings may be based on QPSK and QAM.

The device may select the second modulation scheme setting in response to an indication from the cellular network. Further, the device may receive an indication from the cellular network that an adapted mapping is to be applied on the radio link. For example, in DCI the cellular network may indicate the index corresponding to the second modulation scheme setting to the device and that the adapted mapping is to be applied.

The device may select the second modulation scheme setting at establishment of the radio link or during an ongoing connection via the radio link.

In some implementations, the second modulation scheme setting is selected from a set of multiple second modulation scheme settings and the device re-assigns one of the indices to each of the multiple second modulation scheme settings. Each of these multiple modulation scheme settings may be based on the same modulation scheme having a lower complexity than the modulation scheme(s) on which the set of modulation scheme settings is based.

At step 650, the device re-assigns one of the indices to the selected second modulation scheme setting and adapts the mapping with respect to the set of link parameters mapped to re-assigned index. For example this may involve mapping a lower modulation order and/or a lower transport block size to the re-assigned index.

At step 660, the device uses the adapted mapping as a basis for identifying a second set of link parameters mapped to the re-assigned index.

At step 670, the node configures the radio link according to the identified second set of link parameters.

The second modulation scheme setting may be applied with respect to an uplink part of the radio link and/or with respect to a downlink part of the radio link.

It is to be understood that the methods of FIGS. 5 and 6 may also be combined in a system which includes a network node operating according to the method of FIG. 5 and one or more devices operating according to the method of FIG. 6.

Figure 7:
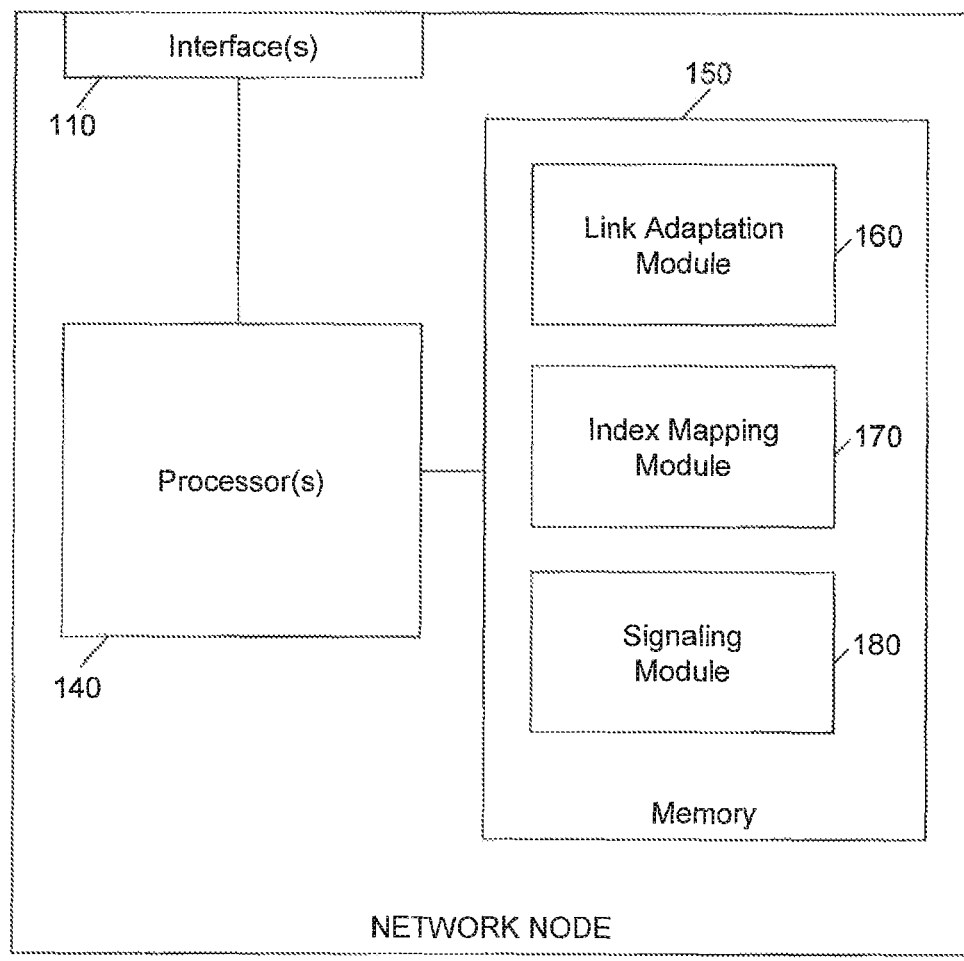
FIG. 7 schematically illustrates a processor based implementation of a network node according to an embodiment of the invention.

FIG. 7 shows a block diagram for schematically illustrating a processor based implementation of a network node which may be utilized for implementing the above-described concepts. For example, the structures as illustrated by FIG. 7 may be utilized to implement the eNB 100.

As illustrated, the network node includes an interface 110. For example, if the network node corresponds to a base station of a cellular network, such as the eNB 100, the interface 110 may correspond to a radio interface through which devices may connect to the cellular network. The interface 110 may not only be utilized for establishing radio links to the devices, but also for controlling such radio links.

Further, the network node is provided with one or more processors 140 and a memory 150. The interface 110 and the memory 150 are coupled to the processor(s) 140, e.g., using one or more internal bus systems of the network node.

The memory 150 includes program code modules 160, 170, 180 with program code to be executed by the processor(s) 140. In the illustrated example, these program code modules include a link adaptation module 160, an index mapping module 170, and a signaling module 180.

The link adaptation module 160 may implement the above-described functionalities of configuring radio links by applying link parameters identified by an index. This may also involve selecting an appropriate index depending on channel quality or other criteria.

The index mapping module 170 may implement the above-described functionalities of re-assigning one or more indices to a lower complexity modulation scheme and adapting link parameters mapped thereto.

The signaling module 180 may implement the above-described functionalities of receiving indications from devices, e.g., concerning device category or preferred usage of a lower complexity modulation scheme, and the above-described functionalities of sending indications to devices, e.g., concerning the selected modulation scheme setting or whether the adapted mapping is applied.

It is to be understood that the structures as illustrated in FIG. 7 are merely exemplary and that the network node may also include other elements which have not been illustrated, e.g., structures or program code modules for implementing known functionalities of an eNB or other network node.

Figure 8:
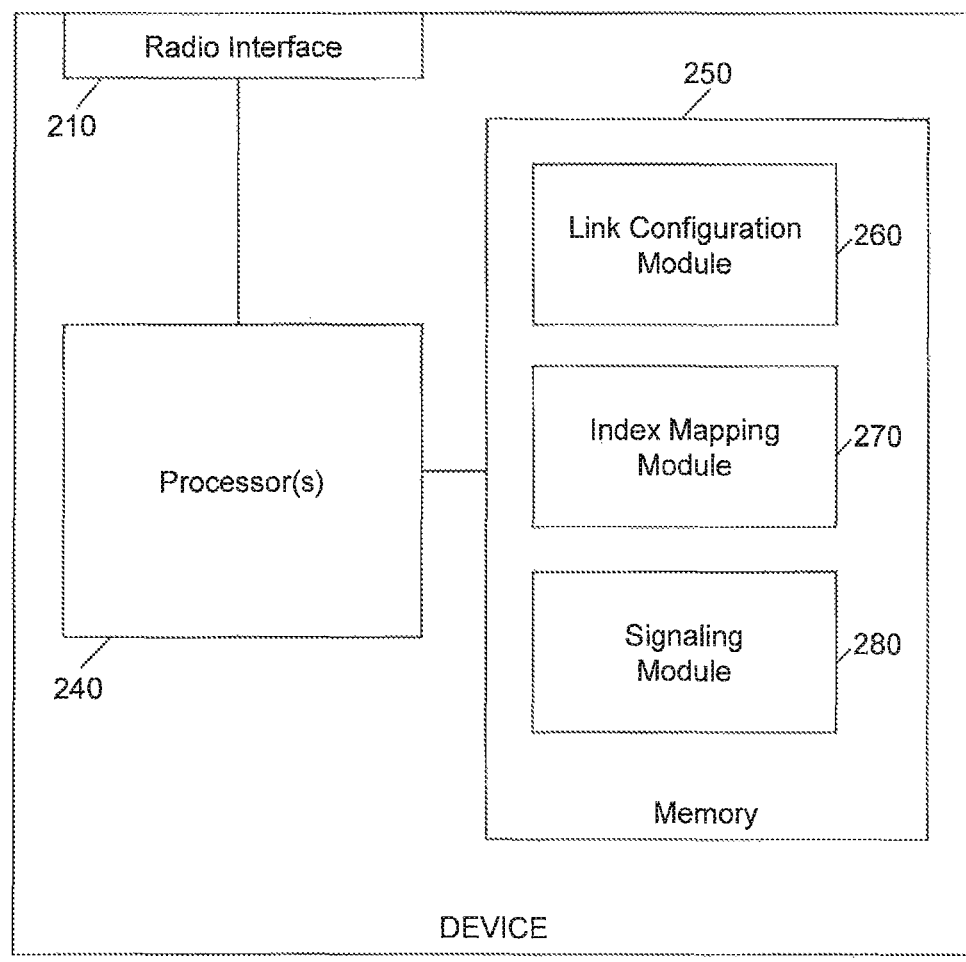
FIG. 8 schematically illustrates a processor based implementation of a device according to an embodiment of the invention.

FIG. 8 shows a block diagram for schematically illustrating a processor based implementation of a device which may be utilized for implementing the above-described concepts. For example, the structures as illustrated by FIG. 8 may be utilized to implement the MTC UE 10.

As illustrated, the device includes a radio interface 210, e.g., a radio interface supporting the LTE radio technology. Through the interface 210, the device may connect to a cellular network. To improve power efficiency, the interface 210 may include a transceiver equipped with a high efficiency power amplifier.

Further, the device is provided with one or more processors 240 and a memory 250. The interface 210 and the memory 250 are coupled to the processor(s) 240, e.g., using one or more internal bus systems of the device.

The memory 250 includes program code modules 260, 270, 280 with program code to be executed by the processor(s) 240. In the illustrated example, these program code modules include a link configuration module 260, an index mapping module 270, and a signaling module 280.

The link configuration module 260 may implement the above-described functionalities of configuring a radio link from the device to the cellular network. This involves by applying link parameters identified by an index.

The index mapping module 270 may implement the above-described functionalities of re-assigning one or more indices to a lower complexity modulation scheme and adapting link parameters mapped thereto.

The signaling module 280 may implement the above-described functionalities of sending indications to the cellular network, e.g., concerning device category or preferred usage of a lower complexity modulation scheme, and the above-described functionalities of receiving indications from the cellular network, e.g., concerning the selected modulation scheme setting or whether the adapted mapping is applied.

It is to be understood that the structures as illustrated in FIG. 8 are merely exemplary and that the device may also include other elements which have not been illustrated, e.g., structures or program code modules for implementing known functionalities of an MTC UE or other kind of UE.

As can be seen, the concepts as explained above allow for efficiently controlling configuration of radio links. In particular, lower complexity modulation schemes may be efficiently supported along one or more other modulation schemes. In this way, low power consumption for MTC UEs and similar devices may be achieved.

It is to be understood that the concepts as explained above are susceptible to various modifications. For example, the concepts could be applied in various kinds of devices and in connection with various kinds of radio technologies. Further, it is to be understood that the concepts may be applied by providing suitably configured software to be executed by a processor of a node of a cellular network or by a processor of a device supporting connectivity to a cellular network.

The invention claimed is:

1. A method, comprising:
using two cellular modulation schemes,
a node of a cellular network selecting a first modulation scheme setting for a first radio link to a first device, the first modulation scheme setting being selected from a set of modulation scheme settings based on a channel quality indicator, each identified by at least one corresponding index; —on the basis of a mapping of each of the indices to a corresponding set of link parameters, the node identifying a first set of link parameters mapped to the index corresponding to the selected first modulation scheme setting;
the node configuring the first radio link according to the identified first set of link parameters; and—the node selecting a second modulation scheme setting for a second radio link to a second device, the second modulation scheme setting being based on a modulation scheme of lower complexity than the set of modulation scheme settings; —the node re-assigning one of the indices to the selected second modulation scheme setting and adapting the mapping with respect to the set of link parameters mapped to re-assigned index;
on the basis of the adapted mapping, the node identifying a second set of link parameters mapped to the re-assigned index;
the node configuring the second radio link according to the identified second set of link parameters; —the node receiving from the second device an indication of a device category indicating that the second device is a machine type communication (MTC) device; and—the node selecting the second modulation scheme based on the indicated device category, wherein the set of modulation scheme settings is based on Quadrature Phase Shift Keying and Quadrature Amplitude Modulation and wherein the second modulation scheme setting is based on Binary Phase Shift Keying, $\pi/2$ Binary Phase Shift Keying or on Gaussian Minimum Shift Keying.

2. The method according to claim 1,
wherein the at least one link parameter comprises a modulation order.

3. The method according to claim 1,
wherein the at least one link parameter comprises a transport block size.

4. The method according to claim 1, comprising:
the node indicating to the second device that the adapted mapping is applied on the second radio link.

5. The method according to claim 1, comprising:
the node performing an analysis of parameters related to radio communication between the second device and the cellular network; and
on the basis of the analysis, the node selecting the second modulation scheme.

6. The method according to claim 1, comprising:
the node selecting the second modulation scheme setting at establishment of the second radio link.

7. The method according to claim 1, comprising:
the node selecting the second modulation scheme setting during an ongoing connection via the second radio link.

8. The method according to claim 1,
wherein the second modulation scheme setting is selected from a set of multiple second modulation scheme settings and the node re-assigns one of the indices to each of the multiple second modulation scheme settings.

9. A method, comprising:
using two cellular modulation schemes,
a device selecting a first modulation scheme setting for a first radio link to a cellular network, the first modulation scheme setting being selected from a set of modulation scheme settings based on a channel quality indicator, each identified by a corresponding index; —on the basis of a mapping of each of the indices to a corresponding set of link parameters, the device identifying a first set of link parameters mapped to the index corresponding to the selected first modulation scheme setting; —the device configuring the first radio link according to the identified first set of link parameters; and
the device selecting a second modulation scheme setting for a second radio link, the second modulation scheme setting being based on a modulation scheme of lower complexity than the set of modulation scheme settings;
the device re-assigning one of the indices to the selected second modulation scheme setting and adapting the mapping with respect to the set of link parameters mapped to the re-assigned index;
on the basis of the adapted mapping, the device identifying a second set of link parameters mapped to the re-assigned index;
the device configuring the second radio link according to the identified second set of link parameters; and
the device transmitting, to a node of the cellular network, an indication of a device category indicating that the device is a machine type communication (MTC) device, —wherein said selection of the first and second modulation schemes is based on the indicated device category, wherein the set of modulation scheme settings is based on Quadrature Phase Shift Keying and Quadrature Amplitude Modulation and wherein the second modulation scheme setting is based on Binary Phase Shift Keying, $\pi/2$ Binary Phase Shift Keying or on Gaussian Minimum Shift Keying.

10. The method according to claim 9,
wherein the at least one link parameter comprises a modulation order.

11. The method according to claim 9,
wherein the at least one link parameter comprises a transport block size.

12. The method according to claim 9, comprising:
the device selecting the second modulation scheme setting in response to an indication from the cellular network.

13. The method according to claim 9, comprising:
the device selecting the second modulation scheme setting at establishment of the second radio link.

14. The method according to claim 9, comprising:
the device selecting the second modulation scheme setting during an ongoing connection via the second radio link.

15. The method according to claim 9,
wherein the second modulation scheme setting is selected from a set of multiple second modulation scheme settings and the device re-assigns one of the indices to each of the multiple second modulation scheme settings.

16. A node for a cellular network, the node comprising:
at least one interface for controlling radio links to devices; and
at least one processor, the at least one processor being configured to:
using two cellular modulation schemes,
select a first modulation scheme setting for a first radio link to a first device, the first modulation scheme setting being selected from a set of modulation scheme settings based on a channel quality indicator, each identified by at least one corresponding index; —on the basis of a mapping of each of the indices to a corresponding set of link parameters, identify a first set of link parameters mapped to the index corresponding to the selected first modulation scheme setting; —configure the first radio link according to the identified first set of link parameters; and—select a second modulation scheme setting for a second radio link to a second device, the second modulation scheme setting being based on a modulation scheme of lower complexity than the set of modulation scheme settings; —re-assign one of the indices to the selected second modulation scheme setting and adapt the mapping with respect to the set of link parameters mapped to re-assigned index; —on the basis of the adapted mapping, identify a second set of link parameters mapped to the re-assigned index; —configure the second radio link according to the identified second set of link parameters; and—receive from the second device an indication of a device category indicating that the second device is a machine type communication (MTC) device; and—select the second modulation scheme based on the indicated device category, wherein the set of modulation scheme settings is based on Quadrature Phase Shift Keying and Quadrature Amplitude Modulation and wherein the second modulation scheme setting is based on Binary Phase Shift Keying, $\pi/2$ Binary Phase Shift Keying or on Gaussian Minimum Shift Keying.

17. The node according to claim 16,
wherein the at least one processor is configured to perform the steps of the method comprising,
a node of a cellular network selecting a first modulation scheme setting for a first radio link to a first device, the first modulation scheme setting being selected from a set of modulation scheme settings, each identified by at least one corresponding index;
on the basis of a mapping of each of the indices to a corresponding set of link parameters, the node identifying a first set of link parameters mapped to the index corresponding to the selected first modulation scheme setting;

the node configuring the first radio link according to the identified first set of link parameters;

the node selecting a second modulation scheme setting for a second radio link to a second device, the second modulation scheme setting being based on a modulation scheme of lower complexity than the set of modulation scheme settings;

the node re-assigning one of the indices to the selected second modulation scheme setting and adapting the mapping with respect to the set of link parameters mapped to re-assigned index;

on the basis of the adapted mapping, the node identifying a second set of link parameters mapped to the re-assigned index; and the node configuring the second radio link according to the identified second set of link parameters.

18. A device, comprising:

a radio interface for connecting to a cellular network; and at least one processor, the at least one processor being configured to:

using two cellular modulation schemes, select a first modulation scheme setting for a first radio link to a cellular network, the first modulation scheme setting selected from a set of modulation scheme settings based on a channel quality indicator, each identified by a corresponding index; —on the basis of a mapping of each of the indices to a corresponding set of link parameters, identify a first set of link parameters mapped to the index corresponding to the selected first modulation scheme setting;

configure the first radio link according to the identified first set of link parameters; and select a second modulation scheme setting for a second radio link, the second modulation scheme setting being based on a modulation scheme of lower complexity than the set of modulation scheme settings;

re-assign one of the indices to the selected second modulation scheme setting and adapt the mapping with respect to the set of link parameters mapped to the re-assigned index;

on the basis of the adapted mapping, identify a second set of link parameters mapped to the re-assigned index;

configure the second radio link according to the identified second set of link parameters; and transmit, to a node of the cellular network, an indication of a device category indicating that the device is a machine type communication (MTC) device, wherein said selection of the first and second modulation schemes is based on the indicated device category, wherein the set of modulation scheme settings is based on Quadrature Phase Shift Keying and Quadrature Amplitude Modulation and wherein the second modulation scheme setting is based on Binary Phase Shift Keying, π/2 Binary Phase Shift Keying or on Gaussian Minimum Shift Keying.

19. The device according to claim 18, wherein the at least one processor is configured to perform the steps of the method comprising, a device selecting a first modulation scheme setting for a first radio link to a cellular network, the first modulation scheme setting being selected from a set of modulation scheme settings, each identified by a corresponding index;

on the basis of a mapping of each of the indices to a corresponding set of link parameters, the device identifying a first set of link parameters mapped to the index corresponding to the selected first modulation scheme setting;

the device configuring the first radio link according to the identified first set of link parameters;

the device selecting a second modulation scheme setting for a second radio link, the second modulation scheme setting being based on a modulation scheme of lower complexity than the set of modulation scheme settings;

the device re-assigning one of the indices to the selected second modulation scheme setting and adapting the mapping with respect to the set of link parameters mapped to the re-assigned index;

on the basis of the adapted mapping, the device identifying a second set of link parameters mapped to the re-assigned index; and the device configuring the second radio link according to the identified second set of link parameters.

* * * * *